O. P. W. EHRHARDT.
CABBAGE CORER.
APPLICATION FILED DEC. 27, 1910.

1,002,242.

Patented Sept. 5, 1911.

WITNESSES:
H. Barnes
L. D. Zesbaugh

INVENTOR:
Otto P. W. Ehrhardt
BY
Pierre Barnes
ATTORNEY

UNITED STATES PATENT OFFICE.

OTTO P. W. EHRHARDT, OF SEATTLE, WASHINGTON.

CABBAGE-CORER.

1,002,242.  Specification of Letters Patent.  Patented Sept. 5, 1911.

Application filed December 27, 1910. Serial No. 599,606.

*To all whom it may concern:*

Be it known that I, OTTO P. W. EHRHARDT, a citizen of the United States, residing at Seattle, in the county of King and State of Washington, have invented certain new and useful Improvements in Cabbage-Corers, of which the following is a specification.

This invention relates to vegetable corers and is especially intended for use in removing the cores from cabbages.

The object of the invention is to produce a power-operative implement of this class which will rapidly perform its function and with a minimum of waste.

The invention consists in the novel construction and combination of parts, as will be hereinafter described and claimed.

Figure 3:
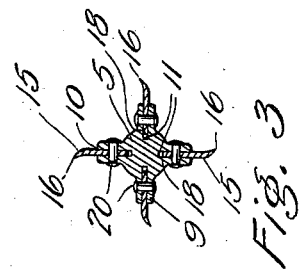
Figure 1:
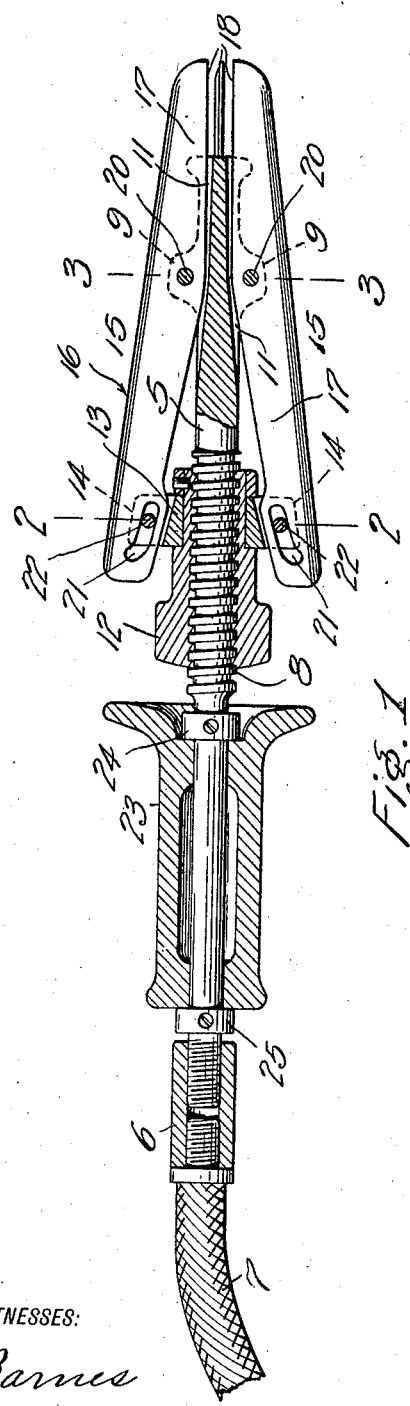
Figure 2:
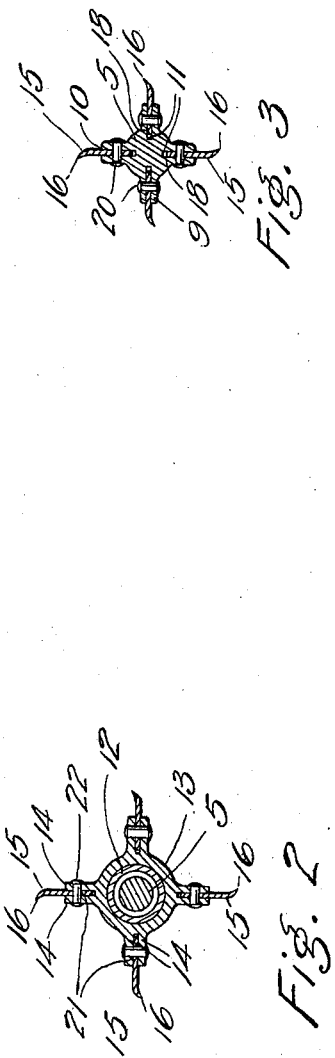

In the accompanying drawings, Figure 1 is a view shown partly in side elevation and partly in longitudinal section of an embodiment of my invention. Figs. 2 and 3 are cross sectional views respectively taken on planes 2—2 and 3—3 of Fig. 1.

Referring to the drawings, the numeral 5 indicates an arbor which is secured from its rear end, as by a coupling 6, with a power-driven flexible shaft, indicated by 7. Intermediate its length, the arbor is provided with a screw-thread, or threads, 8. Adjacent to its outer end, the arbor is formed or provided with radially extending lugs 9 respectively provided with slots 10 which are made co-extensive with longitudinal grooves 11 provided in the arbor. These grooves desirably extend, as illustrated, from a distance to the rear of said lugs to the outer extremity of the arbor.

12 is an internally threaded sleeve, or nut as it will be hereinafter termed, engaging with the screw-thread of the arbor. Rotatably mounted in a peripheral recess of this nut is a collar 13 having pairs of ears 14 extending radially therefrom.

15 indicate the cutting blades of the implement and are each formed with a cutting edge 16 which, as best shown in Figs. 2 and 3, is offset and disposed in angular relation to the plane of inner portion or body 17 of a blade. The bodies of the respective blades are inserted in the spaces obtaining between each pair of collar-ears 14 and also extend through the slots 10 of lugs 9; while the inner edges 18 of the blades project into the arbor grooves 11. Pins 20 extend through apertures provided in said lugs and the associated blades to afford pivotal supports for the latter. In proximity to the rear ends of the blades they are each provided with a cam-slot 21 to accommodate pins 22 extending transversely through the respective collar-ears.

23 represents a sleeve, or handle, loosely mounted on the arbor 5 and secured against endwise motion relatively thereto by set-collars 24 and 25 secured to the arbor.

The operation of the invention is as follows: The implement is manipulated by the operator by holding the same by the handle 23 and whereby the implement is thrust forward to cause the points of the revolving blades 15 to penetrate the article to be cored and by the continued forward movement of the implement the core is entirely removed by a boring action. Where the cores of cabbages, for example, are of various sizes the cutting blades are adjusted by rotating the nut 12 with respect to the arbor so as to advance or retract the same to correspondingly move the pins 22 in the cam slots 21 to swing the adjacent ends of the blades radially outward or inwardly in relation to the arbor axis.

What I claim, is—

1. In a vegetable coring implement, an arbor, a plurality of cutter-blades disposed longitudinally with respect to the arbor and tiltably secured therewith, said cutter blades projecting in advance of the arbor and being each formed with a cutting edge along its edge most remote from the arbor, each of said cutting edges extending in the same plane throughout, and a sleeve provided on said arbor to serve as a handle for manipulating the implement in directing its actions.

2. In a vegetable corer, an arbor, a plurality of cutter blades arranged longitudinally with respect to and projecting in advance of the arbor and tiltably connected therewith, said blades having their cutting edges extending in the same plane throughout, and means adjustable upon the arbor whereby the cutter-blades are tilted.

3. In a vegetable corer, an arbor formed with screw-threads and having near one of its ends a plurality of lugs, a nut for said screw-threads, a collar mounted on said nut and provided with pairs of peripherally disposed spaced ears, cutter blades pivotally connected with said lugs and projecting in advance of the arbor, said blades having their cutting edges extending in the same plane throughout, and pins carried by the various pairs of ears and extending through cam-slots provided in the respective cutter-blades whereby the adjustment of the nut is instrumental in effecting the tilting of the cutter-blades.

4. In a vegetable corer, the combination of an arbor, said arbor being provided with a peripherally disposed screw-thread, a nut engaging said screw-thread, a plurality of cutter-blades tiltably connected with and projecting in advance of said arbor and having their cutting edges extending in the same plane throughout, connection between said nut and the blades whereby the adjustable tilting of the blades is effected through the medium of said nut in coöperation with said screw-thread, a sleeve loosely mounted on the arbor to serve as a handle for manipulating the actions of the corer, and means to prevent any longitudinal movement of said sleeve independently of the arbor.

5. In a vegetable corer, an arbor provided with a peripherally disposed screw-thread, a nut engaging said screw-thread, a plurality of cutter-blades tiltably connected with and projecting in advance of said arbor and having their cutting edges extending in the same plane throughout, connection between said nut and the blades whereby the adjustable tilting of the blades is effected through the medium of said nut in coöperation with said screw thread, and means mounted upon the arbor for directing the actions of the corer.

6. In a vegetable corer, an arbor, a plurality of cutter-blades tiltably connected with and projecting in advance of the arbor and having their cutting edges extending in the same plane throughout, a screw-thread on said arbor, a nut for said screw-thread, and connections between the nut and the blades whereby the latter may be tilted in unison through the agency of said nut and the screw-thread.

7. A vegetable corer comprising an arbor, a plurality of cutter blades tiltably connected with and projecting in advance of the arbor, each of said blades having its cutting edge off-set with respect to the body of the blade, each of the cutting edges extending in the same plane throughout, and means carried by the arbor and connected with the inner ends of the blades for tilting them.

8. A vegetable corer comprising an arbor, a plurality of cutter blades tiltably connected with and projecting in advance of the arbor, each of said blades having its cutting edge off-set with respect to the body of the blade, each of the cutting edges extending in the same plane throughout, and means carried by the arbor and connected with the inner ends of the blades for tilting them, said arbor having the periphery at its outer end grooved, said grooves providing clearances for the outer portions of the blades when tilted.

9. A vegetable corer comprising a rotatable arbor, a plurality of tiltable blades pivotally connected to and projecting in advance of said arbor, means for tilting the blades, and said arbor having its outer portion provided with grooves constituting clearances for the outer portions of the blades when these latter are tilted.

OTTO P. W. EHRHARDT.

Witnesses:
H. BARNES,
E. PETERSON.

Copies of this patent may be obtained for five cents each, by addressing the "Commissioner of Patents, Washington, D. C."